No. 648,988. Patented May 8, 1900.
LA VERNE W. NOYES.
WATER SUPPLY REGULATOR FOR WINDMILLS.
(Application filed Nov. 14, 1898.)
(No Model.)
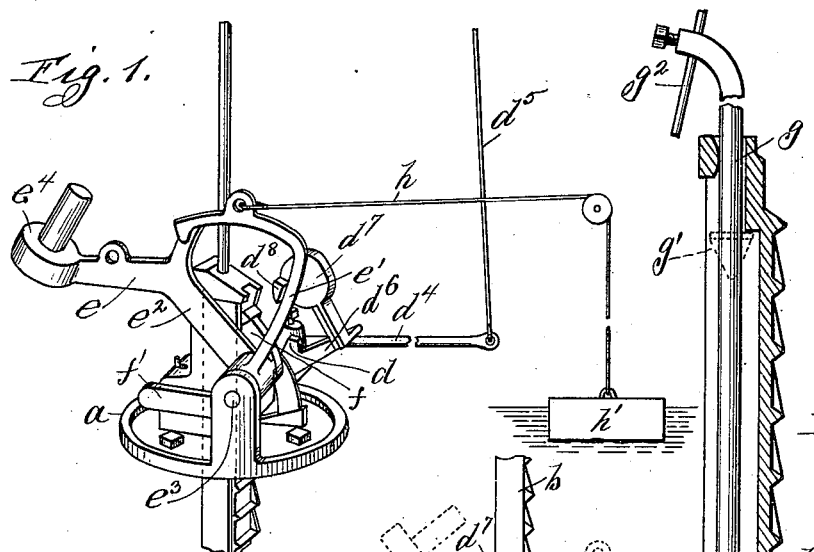

UNITED STATES PATENT OFFICE.

LA VERNE W. NOYES, OF CHICAGO, ILLINOIS.

WATER-SUPPLY REGULATOR FOR WINDMILLS.

SPECIFICATION forming part of Letters Patent No. 648,988, dated May 8, 1900.

Application filed November 14, 1898. Serial No. 696,372. (No model.)

*To all whom it may concern:*

Be it known that I, LA VERNE W. NOYES, a citizen of the United States, residing at Chicago, in the county of Cook and State of Illinois, have invented a certain new and useful Improvement in Water-Supply Regulators for Windmills, of which the following is a full, clear, concise, and exact description, reference being had to the accompanying drawings, forming a part of this specification.

My invention relates to a water-supply regulator for windmills, my object being to provide an improved form of regulator adapted to be controlled by the height of the water in the tank or reservoir to throw the windmill into and out of gear, and thereby regulate the water-supply, the special object of the present invention being to provide means whereby the windmill will be thrown completely into and out of operation and will not be left in any intermediate position, whereby the objections attendant upon the employment of regulators which throw the windmill into and out of the wind gradually may be obviated.

In accordance with the present invention I provide an element or member adapted to be moved in one direction through the agency of motion derived from the windmill, a furling device being provided which is locked in position during the employment of said member and until the member nears the end of its travel, when it releases the furling device, and thereby causes the mill to be thrown out of the wind, the furling device partaking of sufficient movement to throw the mill completely out of action. Independent means, such as a weight, is provided for moving the member in the opposite direction to carry with it the furling device, thereby throwing the mill completely into operation, the release of the member being accomplished through the agency of the float in the tank. The member above referred to may be connected with the windmill to receive motion therefrom in any desired manner. For instance, it may be connected through mechanical means with some reciprocating or moving part of the windmill itself, or it may receive motion through hydraulic pressure derived from the movement of the water during the action of the pump driven by the windmill.

In the present application I have specifically illustrated and described a form of regulator wherein the movement of the member is accomplished mechanically—that is, by connecting the actuating parts with some moving part of the mill, such as the piston-rod.

In a companion case filed of even date herewith, Serial No. 700,630½, I have described a construction wherein the movement is secured through the agency of the pressure of the water supplied by the pump driven by the windmill, the control thus being hydraulic in its nature as distinguished from mechanical control, and in said application I have inserted claims to this specific embodiment of my invention, while in the present application I have inserted generic claims to cover both forms of the invention and also specific claims drawn to cover the embodiment of my invention wherein the control is accomplished through mechanical means.

In the preferred form of my invention, as illustrated herein, I provide for the moving member a ratchet-bar which is moved in one direction by a dog adapted to be reciprocated by connection with a moving part of the mill, the ratchet-bar being moved in the opposite direction by means of a weight or similar device, the movement of the bar being controlled by a regulating or controlling lever which is responsive to the movement of the float in the tank or reservoir.

I have illustrated my invention in the accompanying drawings, in which—

Figure 1 is a perspective view of the regulator of my invention. Fig. 2 is a sectional view thereof. Fig. 3 is a view showing the controlling-lever of the regulator in its alternative position. Fig. 4 is a view of the regulator looking from the side opposite to that shown in Fig. 3. Fig. 5 is a front view of the regulator. Fig. 6 is a sectional view on line 6 6, Fig. 5.

Like letters refer to like parts in the several figures.

The standard $a$ of the regulator is mounted upon any suitable support and is arranged to permit the ratchet-bar $b$ to move vertically therethrough. The ratchet-bar carries at the lower end a rod $c$, between which and the ratchet-bar a spring $c'$ is interposed, a weight $c^2$ being suspended from the rod $c$ to move the ratchet-bar $b$ downward when released, the spring $c'$ serving to take up the jar due to the inertia of the weight. The face of the bar $b$ is provided with ratchet-teeth, with which an actuating-dog $d$ is adapted to engage, the dog $d$ being pivoted at $d'$ upon a casting $d^2$, journaled to rotate about the pivot $d^3$, carried upon the base or standard $a$. A rod $d^4$ is secured to the casting $d^2$ and is connected by means of the wire or rod $d^5$ with some reciprocating part of the mill—as, for instance, the pump-rod—whereby during the operation of the mill the rod $d^4$ and the casting $d^2$ are rocked upon the pivot $d^3$, thus reciprocating the dog $d$ and moving the ratchet-bar $b$ upward step by step. Formed integral with the dog $d$ is an arm $d^6$, carrying upon the end a weight $d^7$, so placed as to serve to yieldingly hold the dog $d$ in engagement with the ratchet-teeth. The weight $d^7$ carries a lug $d^8$, adapted to line within the space between the arms $e'$ $e^2$ of the lever $e$, which is pivoted upon the standard at $e^3$, the lever carrying upon the end a weight $e^4$. When the lever $e$ is rocked to the left, Figs. 1 and 2, arm $e'$ engages lug $d^8$ to carry the weight to the left and bring the dog $d$ into engagement with the ratchet-bar, and when lever $e$ is rocked to the right the arm $e^2$ thereof engages lug $d^8$ and throws the weight to the right to carry the dog out of engagement with the ratchet-bar. In order to prevent the backward movement of the ratchet-bar, a detent or pawl $f$ is provided, which is journaled upon the pin or pivot $e^3$, and the face of the pawl $f$ carries a slot $f^2$, within which a lug or projection $d^9$ on the hub of the lever $e$ is adapted to move. When the lever $e$ is rocked to the right, the lug $d^9$ engages the lower wall of the slot $f^2$, thereby rocking pawl $f$ to carry the same out of engagement with the ratchet-bar, and when the lever $e$ is rocked to the left again the pawl $f$ is rocked into engagement with the ratchet-bar through the agency of the weight $f'$, which is formed integral with the lower end of said pawl $f$. The pawl $f$ carries a weighted portion $f'$ to yieldingly hold the same in engagement with the ratchet-bar. The lever $e$ is connected by a rope $h$ or other connection with the float $h'$ in the tank, whereby the ascent or descent of the float rocks the lever to and fro.

Through an opening in the upper end of the ratchet-bar $b$ the furling-rod $g$ is adapted to pass, said rod carrying at the lower end an arrow-pointed portion $g'$, which constitutes a laterally-extending portion adapted to engage with the lug $a^2$, provided upon the base $a$. Upon the ratchet-bar is carried an oblique wall $b^2$, which when the ratchet-bar nears the upper end of its travel engages the oblique end of the furling-rod $g$ to move the same laterally out of engagement with the lug $a^2$. At the upper end of the furling-rod $g$ is secured the furling-wire $g^2$, which extends upward and is connected with the furling mechanism of the mill.

The regulator is in the present instance illustrated in connection with a mill requiring a downward pull upon the furling-rod to carry the mill into the wind, the mill moving out of the wind automatically when the furling-rod is released and permitted to move upward.

The operation of the regulator is as follows: Assuming that the mill is in operation and that the float is in an intermediate position—that is, between the extreme upper and lower positions—the parts of the regulator will occupy the positions illustrated in Fig. 1. The weight $d^7$ rests in position to hold the dog $d$ out of engagement with the ratchet-bar, and as the rod $d^5$ moves up and down the dog $d$ is reciprocated without imparting movement to the ratchet-bar. The ratchet-bar is at the lower end of its travel and the arrow-pointed end $g'$ of the furling-rod $g$ is in engagement with the lug $a^2$, the mill being thus held in the wind. As the float $h'$ rises the lever $e$ is permitted to rock to the left, due to the weight $e$, and the arm $e'$ of said lever, through its engagement with the lug $d^8$, moves the weight $d^7$ to the left until said weight is carried past the pivot about which the same rocks, when the weight $d^7$ moves to the left, as shown in Fig. 3, carrying the dog $d$ into engagement with the ratchet-bar, so that as the rod $d^5$ moves up and down the dog $d$ is reciprocated to move the ratchet-bar upward step by step. The movement of the lever $e$ to the left also moves the pawl $f$ into engagement with the ratchet-bar, due to the coaction of the lug $d^9$ and the slot $f'$, so that the backward movement of the ratchet-bar is prevented by the pawl $f$. During this upward movement of the ratchet-bar the furling-rod $g$ is held down, due to the engagement of the arrow-pointed end $g'$ and the lug $a^2$. As the ratchet-bar approaches the upper end of its travel the oblique wall $b^2$ thereon engages the arrow-pointed end $g'$, shifting the same laterally and releasing the same from the lug $a^2$. The furling-rod $g$ being thus released is moved upward, thereby throwing the mill completely out of operation, the arrow-pointed end $g'$ being stopped at the upper end of the ratchet-bar, as shown in dotted lines. The mill is thus thrown out of operation. As the water-level in the tank falls toward the lower predetermined level the descent of the float $h'$ rocks the lever $e$ upon its pivot, and the engagement of the arm $e^2$ with the lug $d^8$ moves the weight $d^7$ to the right, Figs. 1 and 2, to carry dog $d$ out of engagement with the ratchet-bar. The further movement of the lever $e$ to the right carries pawl $f$ out of engagement with the ratchet-bar, thereby releasing the ratchet-bar and permitting the same to fall, the weight $c^2$ being sufficient to exert the required force necessary to move the furl-rod $g$ downward and throw the mill into the wind. The descent of the ratchet-bar and the weight carries the furling-rod $g$ downward until the arrow-pointed end thereof engages with the lug $a^2$, the furling-rod being thus held in this position until during the ascent of the ratchet-bar the oblique wall $b^2$ comes in engagement with the end of said furling-rod to move the same out of engagement with the lug, and thereby throw the mill out of the wind again.

Having described my invention, what I claim as new, and desire to secure by Letters Patent, is—

1. In a water-supply regulator for windmills, a reciprocating part arranged to be moved in one direction by motion derived from the operation of the windmill, a part connected with the furling device of the windmill normally locked in position and released by said reciprocating part at a prearranged point in the travel thereof, means for returning the said parts to the initial positions, a tank or reservoir, and a float for controlling the movement of said reciprocating part, substantially as described.

2. In a water-supply regulator for windmills, a reciprocating part, mechanism deriving motion from the operation of the windmill for moving the same in one direction, a tank or reservoir, a float for throwing said mechanism into operation, a part connected with the furling device of the windmill normally locked in position and released by said reciprocating part during the travel thereof, a lock for holding said reciprocating part in the new position to which the same is moved, and means, as a weight, controlled by said float for returning said reciprocating part to the initial position, substantially as described.

3. In a water-supply regulator for windmills, the combination with a movable member, of means for moving the same in one direction by motion derived through the operation of the windmill, a part connected with the furling device of the windmill and locked during such movement of said member and released thereby at a predetermined point in the travel thereof, means, as a weight, for moving said member and said furling device to the initial position, a tank or reservoir, and a controller, as a float, responsive to the change of level in the reservoir for controlling the movement of said member, substantially as described.

4. In a water-supply regulator for windmills, the combination with a movable member, of means for moving the same in one direction by motion derived through the operation of the windmill, a part connected with the furling device of the windmill and locked during such movement of said member and released thereby at a predetermined point in the travel thereof, means, as a weight, for moving said member and said furling device to the initial position, a lock for holding said member in the position to which the same is moved by the operation of said windmill, a tank or reservoir, and a controller, as a float, responsive to the change of level in the reservoir for releasing said lock, substantially as described.

5. In a water-supply regulator for windmills, the combination with a movable member, of means for moving the same in one direction by motion derived through the operation of the windmill, a tank or reservoir, a float or other device responsive to the change of level in the reservoir arranged to throw said means into operation as the float approaches its upper limit, a part connected with the furl device of the windmill and locked during such movement of said member and released at a predetermined point in the travel thereof, means, as a weight, for moving said member and the part connected with the furl device to the initial position, said float being arranged to release said weight to effect said movement as the float approaches its lower limit, substantially as described.

6. In a water-supply regulator for windmills, the combination with a ratchet-bar, of an actuating-dog for moving the same in one direction and deriving motion from a moving part of the windmill, a part connected with the furling device of the windmill and locked during such movement of said ratchet-bar and released near the end of the travel thereof, means, as a weight, for moving said ratchet-bar and said furling device to the initial position, a tank or reservoir, and a controller, as a float, responsive to the change of level in the reservoir for moving said dog into and out of operative engagement with the ratchet-bar, substantially as described.

7. In a water-supply regulator for windmills, the combination with a ratchet-bar of an actuating-dog for moving said ratchet-bar in one direction and deriving motion from a moving part of the mill, a pawl for preventing the backward movement of the ratchet-bar, a part connected with the furling device of a windmill and locked during such advance movement of the ratchet-bar and released near the end of the travel thereof, a tank or reservoir, and a controller, as a float, responsive to the change of level in the reservoir for moving said pawl and actuating-dog into and out of engagement with the ratchet-bar, substantially as described.

8. In a water-supply regulator for windmills, the combination with a ratchet-bar, of an actuating-dog reciprocated by a moving part of the windmill to move the ratchet-bar in one direction, a part connected with the furling device of the windmill and locked during such movement of said ratchet-bar and released near the end of the travel thereof, a checking-pawl, a tank or reservoir, a controller, as a float, responsive to the change of level in the reservoir for moving said actuating-dog and pawl into and out of engagement with the ratchet-bar, and means for returning the ratchet-bar to the initial position, substantially as described.

9. The combination with the ratchet-bar, of the reciprocating dog operated by the windmill, the pawl, the controlling-lever, for moving said dog and pawl into and out of engagement with the ratchet-bar, a furl-rod moved in one direction with said ratchet-bar, a lock for holding the furl-rod during the movement of said ratchet-bar in one direction and means carried by said ratchet-bar for releasing said furl-rod as the ratchet-bar approaches the end of its travel, substantially as described.

10. The combination with the reciprocating ratchet-bar, of the actuating-dog and the pawl, the arrow-pointed furl-rod moved downward with said ratchet-bar, the lateral extension or lug on the standard for holding said furl-rod in its lower position, and the oblique side wall on the ratchet-bar for moving said furl-rod out of engagement with said lateral extension or lug, substantially as described.

11. In a water-supply regulator for windmills, a ratchet-bar, means operated by the windmill for moving the same in one direction step by step, a part connected with the furling device of the windmill locked in position during such travel of the ratchet-bar and released thereby at a prearranged point in the travel of said ratchet-bar, and means for returning the ratchet-bar to the initial position, substantially as described.

12. In a water-supply regulator for windmills, a ratchet-bar, means operated by the windmill for moving the ratchet-bar in one direction step by step, a part connected with the furling device of the windmill locked in position during such travel of the ratchet-bar and released thereby at a prearranged point in the travel of said ratchet-bar, means for returning the ratchet-bar to the initial position, a tank or reservoir, and a float for controlling the movement of the ratchet-bar, substantially as described.

13. In a water-supply regulator for windmills, the combination with a part connected with the furling device of a windmill and arranged to throw the mill into or out of the wind according as the same is moved in one direction or the other, said part being normally locked at one end of the travel thereof and arranged when released to move abruptly to the other end of the travel thereof, a moving member deriving motion from the operation of the windmill and arranged to move relatively to said part and to move gradually from one end of the travel to the other, and arranged to release said part near the end of the advance travel of said moving member, and means for returning said part and said moving member to the initial positions thereof, substantially as described.

14. In a water-supply regulator for windmills, the combination with a part connected with the furling device of a windmill, of a lock for holding the same at one end of the travel thereof, a moving member deriving motion from the windmill and arranged to release said part near the end of the travel of said member, and means for returning said part and said moving member to the initial positions thereof, substantially as described.

15. In a water-supply regulator for windmills, the combination with a part connected with the furling device of a windmill and having two positions of rest, one to hold the windmill in the wind and the other to hold the windmill out of the wind, a moving member, means for moving said member in one direction by energy derived from the operation of the windmill, means independent of the operation of the windmill for moving said member in the opposite direction, means controlled by the movement of said moving member for causing said part to move abruptly from one position to the other, a tank or reservoir and a float or other controller therein for controlling the time of movement of said movable member, substantially as described.

In witness whereof I have hereunto subscribed my name in the presence of two witnesses.

LA VERNE W. NOYES.

Witnesses:
W. CLYDE JONES,
M. R. ROCHFORD.